United States Patent
Yang et al.

(10) Patent No.: US 11,681,599 B2
(45) Date of Patent: Jun. 20, 2023

(54) STORAGE DEVICE, METHOD OF OPERATING THE SAME, AND METHOD OF PROVIDING A PLURALITY OF PERFORMANCE TABLES

(71) Applicant: Samsung Electronics Co., Ltd., Suwon-si (KR)

(72) Inventors: Haejung Yang, Suwon-si (KR); Heeyoub Kang, Seoul (KR); Youngrok Oh, Seoul (KR); Kitaek Lee, Hwaseong-si (KR); Heechul Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/510,634

(22) Filed: Oct. 26, 2021

(65) Prior Publication Data

US 2022/0334940 A1    Oct. 20, 2022

(30) Foreign Application Priority Data

Apr. 20, 2021    (KR) .................. 10-2021-0051401

(51) Int. Cl.
*G06F 11/00* (2006.01)
*G06F 11/30* (2006.01)
*G06F 11/34* (2006.01)

(52) U.S. Cl.
CPC ...... *G06F 11/3034* (2013.01); *G06F 11/3058* (2013.01); *G06F 11/3409* (2013.01); *G06F 11/3466* (2013.01)

(58) Field of Classification Search
CPC ............ G06F 11/3034; G06F 11/3058; G06F 11/3079; G06F 11/3089; G06F 11/3093; G06F 11/324; G06F 11/327; G06F 11/328; G06F 11/3409; G06F 11/3466; G06F 1/20; G06F 1/203; G06F 1/206
See application file for complete search history.

(56) References Cited

U.S. PATENT DOCUMENTS

| 7,210,048 | B2 | 4/2007 | Bodas |
| 7,945,743 | B2 | 5/2011 | Belady |
| 7,984,250 | B2 | 7/2011 | Steinbrecher et al. |
| 8,374,730 | B2 | 2/2013 | Conroy et al. |
| 10,198,214 | B2 * | 2/2019 | Kim ................. G06F 3/0634 |

(Continued)

FOREIGN PATENT DOCUMENTS

KR    102044610 B1    11/2019

*Primary Examiner* — Anthony J Amoroso
(74) *Attorney, Agent, or Firm* — Muir Patent Law, PLLC

(57) ABSTRACT

A storage device includes at least one non-volatile memory device, a first temperature sensor and a second temperature sensor arranged adjacent to the at least one non-volatile memory device, and a controller controlling an operation performance level of the at least one non-volatile memory device based on a plurality of performance tables, a first temperature detected by the first temperature sensor, and a second temperature detected by the second temperature sensor. Each performance table includes a plurality of entries, and each entry includes information regarding the operation performance level of the at least one non-volatile memory device. Each performance table corresponds to a result of a calculation regarding the first temperature and the second temperature.

19 Claims, 8 Drawing Sheets

(56) References Cited

U.S. PATENT DOCUMENTS

| | | |
|---|---|---|
| 10,282,271 B2 | 5/2019 | Shin et al. |
| 10,289,323 B2 | 5/2019 | Yang et al. |
| 10,539,988 B2 | 1/2020 | Izumi |
| 11,016,545 B2 | 5/2021 | Yang et al. |
| 2009/0175311 A1* | 7/2009 | Xin .................... G06F 1/206 374/45 |
| 2009/0323277 A1* | 12/2009 | Hosokawa ............. G06F 1/206 361/679.54 |
| 2013/0080679 A1 | 3/2013 | Bert |
| 2015/0198957 A1* | 7/2015 | Montero ............... G06F 3/0481 700/300 |
| 2016/0062421 A1 | 3/2016 | Sugawara et al. |
| 2019/0004723 A1 | 1/2019 | Li et al. |
| 2019/0041928 A1 | 2/2019 | Bahirat |
| 2019/0073154 A1 | 3/2019 | Gwin |
| 2019/0163387 A1 | 5/2019 | Jin et al. |
| 2019/0317672 A1* | 10/2019 | Linnen .................. G06F 3/0659 |
| 2020/0348884 A1 | 11/2020 | Boenapalli et al. |

\* cited by examiner

STORAGE DEVICE, METHOD OF OPERATING THE SAME, AND METHOD OF PROVIDING A PLURALITY OF PERFORMANCE TABLES

CROSS-REFERENCE TO RELATED APPLICATION

This application is based on and claims priority under 35 U.S.C. § 119 to Korean Patent Application No. 10-2021-0051401, filed on Apr. 20, 2021, in the Korean Intellectual Property Office, the disclosure of which is incorporated by reference herein in its entirety.

BACKGROUND

The inventive concept relates to a storage device, a method of operating the storage device, and a method of providing a plurality of performance tables.

Memory systems may be largely classified as volatile memory systems and non-volatile memory systems. A non-volatile memory retains data even when power supply is interrupted. However, data is erased in a volatile memory when power supply is interrupted. Non-volatile memories include a read only memory (ROM), a magnetic disk, an optical disk, flash memory, resistive RAM (RRAM), phase change RAM (PRAM), and magnetic RAM (MRAM). Flash memory refers to a memory for storing data according to a change in the threshold voltage of a metal oxide semiconductor (MOS) transistor and includes NAND flash memory and NOR flash memory.

Meanwhile, when a memory system operates at high performance, the internal temperature of the memory system increases. Excessive rise in the internal temperature of a system may cause malfunction of internal devices of the system, may damage the internal devices of the system, and may even injure a system operator.

SUMMARY

The inventive concept provides a storage device having improved operation performance and a method of operating the same.

According to an aspect of the inventive concept, there is provided a storage device. The storage device includes at least one non-volatile memory device, a first temperature sensor and a second temperature sensor arranged adjacent to the at least one non-volatile memory device, and a controller controlling an operation performance level of the at least one non-volatile memory device based on a plurality of performance tables, a first temperature detected by the first temperature sensor, and a second temperature detected by the second temperature sensor. Each of the performance tables may include a plurality of entries each including information regarding the operation performance level of the at least one non-volatile memory device, and each of the performance tables corresponds to a result of a calculation regarding the first temperature and the second temperature.

According to an aspect of the inventive concept, there is provided a method of operating a storage device. The method includes detecting a first temperature of a first portion adjacent to a non-volatile memory device and a second temperature of a second portion spaced apart from the first portion across the non-volatile memory device, and selecting one of a plurality of performance tables. The plurality of performance tables include information regarding an operation performance level of the non-volatile memory device based on the first temperature and the second temperature.

According to an aspect of the inventive concept, there is provided a method of providing a plurality of performance tables. The method includes arranging a first temperature sensor and a second temperature sensor at different locations inside a casing of a storage device including a plurality of non-volatile memory devices, defining a relationship among a first temperature detected by the first temperature sensor, a second temperature detected by the second temperature sensor, and a temperature of the casing, according to a flowing speed of a fluid for cooling the casing and an ambient temperature around the casing, and generating a plurality of performance tables. Each performance table includes a plurality of entries, and each entry includes information regarding an operation performance level of the non-volatile memory devices based on the relationship among the temperature of the casing, the first temperature, and the second temperature.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
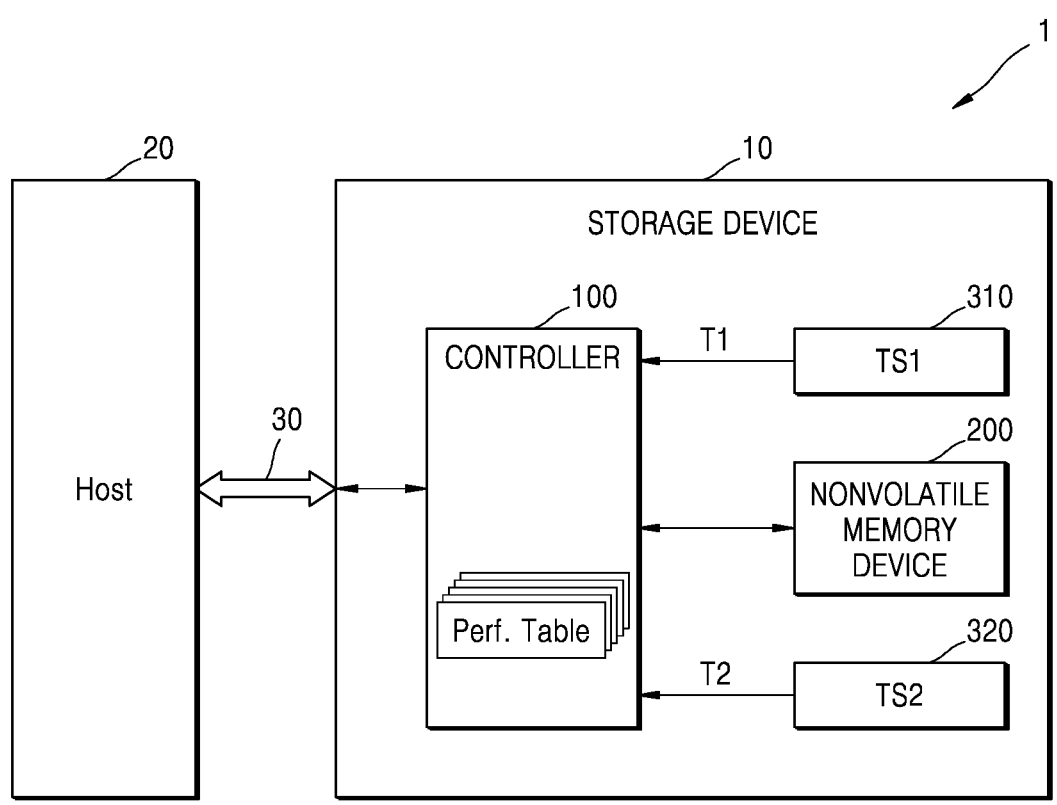
FIG. 1 is a block diagram of a data storage system according to example embodiments.

FIG. 1 is a block diagram of a system 1 according to example embodiments.

The system 1 according to example embodiments may include a storage device 10 and a host 20.

The host 20 may communicate with the storage device 10 to transmit a command related to a memory operation and a confirmation regarding the command. The host 20 may communicate with the storage device 10 by using an interface protocol such as Peripheral Component Interconnect-Express (PCI-E), Advanced Technology Attachment (ATA), Serial ATA (SATA), parallel ATA (PATA), and Serial Attached SCSI (SAS). According to example embodiments, the interface protocol for communication between the host 20 and the storage device 10 may be one of Universal Serial BUS (USB), Multi-Media Card (MMC), Enhanced Small Disk Interface (ESDI), and Integrated Drive Electronics (IDE).

The storage device 10 may include a controller 100, a non-volatile memory device 200, and a first temperature sensor 310 and a second temperature sensor 320 configured to measure temperatures around the non-volatile memory device 200. The controller 100 may receive a command related to a memory operation from the host 20, generate an internal command and an internal clock signal by using the same, and provide the internal command and the internal clock signal to the non-volatile memory device 200. The non-volatile memory device 200 may store data to be written in a memory cell array in response to the internal command or provide read data to the controller 100 in response to the internal command.

The storage device 10 according to example embodiments may be, but is not limited to, a solid state drive (SSD) or a secure digital (SD) card. Also, the non-volatile memory device 200 may be a flash memory device. However, the inventive concept is not limited thereto, and the non-volatile memory device 200 may be a phase change RAM (PRAM) device, a magnetic RAM (MRAM) device, a resistive RAM (ReRAM) device, or a ferroelectric RAM (FeRAM) device. When the non-volatile memory device 200 is a flash memory device, the non-volatile memory device 200 may be a floating gate-type NAND flash memory device or a charge trap flash (CTF)-type NAND flash memory device. Memory cell transistors of the non-volatile memory device 200 may be 2-dimensionally arranged or 3-dimensionally arranged.

According to example embodiments, the controller 100 may control the operation of the storage device 10 and data exchange between the host 20 and the non-volatile memory device 200. For example, the controller 100 may control the non-volatile memory device 200 to write data or read data according to a request of the host 20. Also, the controller 100 may control a series of operations (e.g., performance control, merging, wear-leveling, etc.) needed for efficient management of the non-volatile memory device 200.

According to example embodiments, the controller 100 may store a plurality of performance tables therein. Here, the performance tables may each include a plurality of entries each including information regarding operation performance (i.e., an operation performance level) of the non-volatile memory device 200. In some embodiments, the information regarding the operation performance may include a clock speed of a clock at which the non-volatile memory device 200 operates. The controller 100 may control the operation of the non-volatile memory device 200 based on the performance tables and a first temperature T1 measured by the first temperature sensor 310 and a second temperature T2 measured by the second temperature sensor 320, which will be described later. According to example embodiments, the performance tables may be stored in the non-volatile memory device 200, and the controller 100 may control the operation performance of the non-volatile memory device 200 based on the performance tables stored in the non-volatile memory device 200.

The first temperature sensor 310 and the second temperature sensor 320 may generate data (e.g., a log) regarding temperatures inside the storage device 10. For example, the first temperature sensor 310 and the second temperature sensor 320 may periodically measures temperatures inside the storage device 10, and store such measured temperature in a memory serving as a log. In some embodiments, each of the first and second temperature sensors 310 and 320 may have a memory of a log for recording the measured temperatures. In some embodiments, the memory controller 100 may have a memory of a log for recording the measured temperatures. In some embodiments, the measured temperatures may be recorded in the non-volatile memory device 200. The first temperature sensor 310 may measure a first temperature T1 of a first portion inside the storage device 10. The second temperature sensor 320 may measure a second temperature T2 of a second portion inside the storage device 10. The first temperature sensor 310 and the second temperature sensor 320 may measure temperatures of different portions inside the storage device.

According to example embodiments, the controller 100 and the non-volatile memory device 200 may each include internal temperature sensors embedded therein, and the first temperature sensor 310 and the second temperature sensor 320 may be external temperature sensors arranged outside the controller 100 and the non-volatile memory device 200.

The non-volatile memory device 200 is a storage space for non-volatilely storing data and may store an operating system (OS), various programs, and various data.

Figure 2:
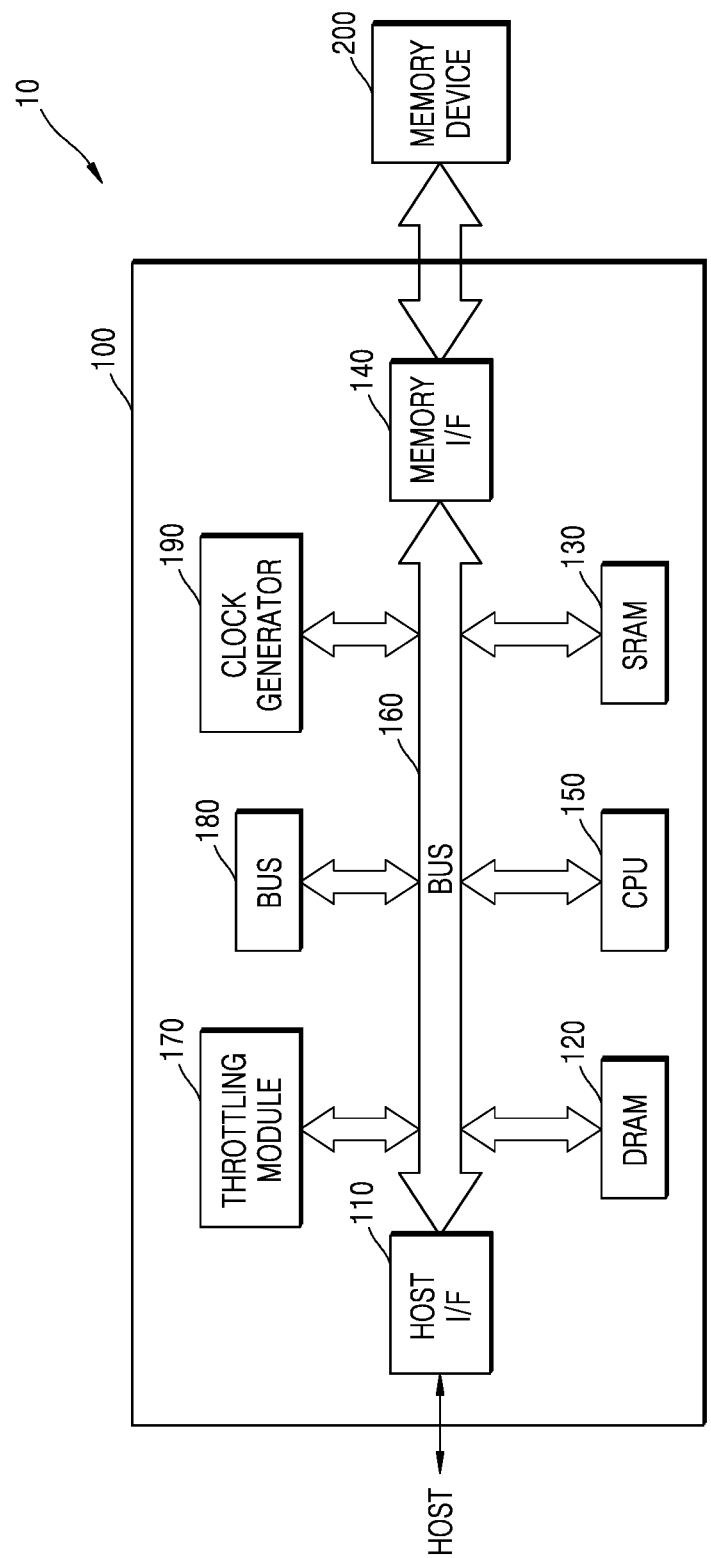
FIG. 2 is a block diagram of a controller according to an embodiment of the inventive concept.

FIG. 2 is a block diagram of the controller 100 according to an embodiment of the inventive concept.

Referring to FIGS. 1 and 2, the controller 100 may include a host interface 110, dynamic random access memory (DRAM) 120, static RAM (SRAM) 130, a memory interface 140, a central processing unit (CPU) 150, a bus 160, a throttling module 170, a timer 180, and a clock generator 190.

The host interface 110 may include an interface protocol as described above to communicate with the host 20. The DRAM 120 and the SRAM 130 may each volatilely store data and/or programs. The memory interface 140 may communicate with the non-volatile memory device 200.

The CPU 150 may perform overall control operations for writing data to the non-volatile memory device 200 or reading data from the non-volatile memory device 200.

The throttling module 170 may collect data related to the first temperature T1 and the second temperature T2 and estimate an ambient environment of the storage device 10, e.g., an ambient temperature, airflow, etc., based on collected data (e.g., a log) regarding the first temperature T1 and the second temperature T2. The throttling module 170 may determine a target performance level of the storage device 10 based on the estimated ambient environment and the first temperature T1 and the second temperature T2 and adjust the performance of the storage device 10 to operate at a determined target performance level.

According to example embodiments, the throttling module 170 may adjust the performance of the storage device 10 based on a plurality of performance tables. For example, the throttling module 170 may adjust the performance of the storage device 10 based on 6 or more performance tables. According to example embodiments, the throttling module 170 may select one of the performance tables based on data regarding the first temperature T1 and the second temperature T2.

According to example embodiments, the throttling module 170 may select one of the performance tables based on a result of a calculation regarding the first temperature T1 and the second temperature T2. For example, the throttling module 170 may select one of the performance tables based on a difference between the first temperature T1 and the second temperature T2.

According to example embodiments, the throttling module 170 may adjust the performance of the storage device 10 according to one of the first temperature T1 and the second temperature T2 and a selected performance table. For example, the throttling module 170 may adjust the performance of the storage device 10 based on the first temperature T1 that is higher than the second temperature T2 and the selected performance table. In some example embodiments, the throttling module 170 may adjust the performance of the storage device 10 based on the second temperature T2 that is lower than the first temperature T1 and the selected performance table.

According to example embodiments, the throttling module 170 may adjust the performance of the storage device 10 according to a result of a calculation regarding the first temperature T1 and the second temperature T2 and a selected performance table. For example, the throttling module 170 may adjust the performance of the storage device 10 based on an average of the first temperature T1 and the second temperature T2 and the selected performance table.

The timer 180 may provide time information to the CPU 150 and the throttling module 170. The throttling module 170 and the timer 180 may each be implemented as hardware, software, or a combination of hardware and software.

When the throttling module 170 and the timer 180 are implemented as software, the non-volatile memory device 200 may store programs (e.g., emulators) for the throttling module 170 and the timer 180. When the storage device 10 is powered on, the programs for the throttling module 170 and the timer 180 may be loaded from the non-volatile memory device 200 to the SRAM 130 and executed by the CPU 150.

The clock generator 190 may generate and provide clock signals needed for operations of the CPU 150, the DRAM 120, and the non-volatile memory device 200. Rate (or frequency) of clock signals provided to the CPU 150, the DRAM 120, and the non-volatile memory device 200 may be different from one another. The clock generator 190 adjusts rate of clock signals respectively applied to the CPU 150, the DRAM 120, and the non-volatile memory device 200 according to a target performance level determined by the throttling module 170, and thus, the performance of the storage device 10 may be adjusted according to an ambient environment of the storage device 10.

Although not shown, the storage device 10 may further include components such as read only memory (ROM) (not shown) for storing code data executed when the storage device 10 is powered on and an error correction code (ECC) engine (not shown) for encoding data to be stored in the non-volatile memory device 200 and decoding data read out from the non-volatile memory device 200.

Figure 3:
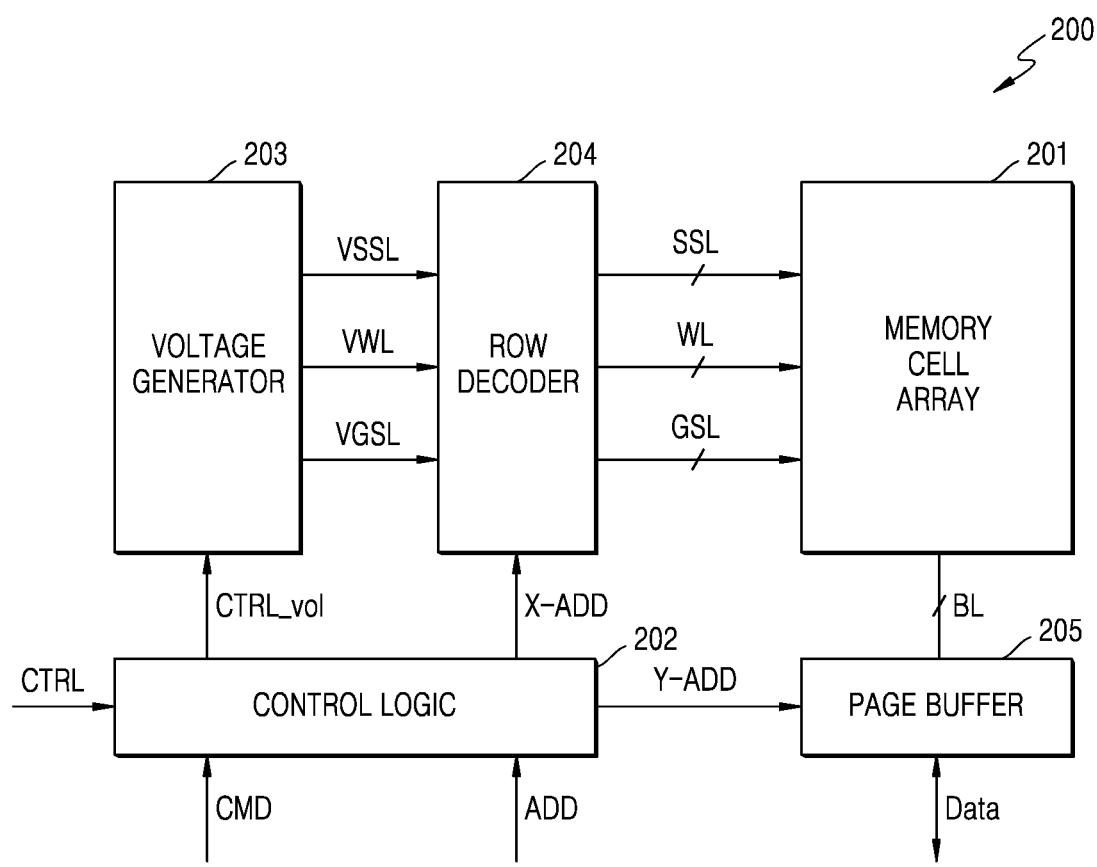
FIG. 3 is a block diagram of a non-volatile memory device shown in FIGS. 1 and 2.

FIG. 3 is a block diagram of the non-volatile memory device 200 shown in FIGS. 1 and 2.

Referring to FIG. 3, the non-volatile memory device 200 may include a memory cell array 201, control logic 202, a voltage generator 203, a row decoder 204, and a page buffer 205.

The memory cell array 201 may be connected to one or more string select lines SSL, a plurality of word lines WL, and one or more ground select lines GSL and may also be connected to a plurality of bit lines BL. The memory cell array 201 may include a plurality of memory cells arranged at regions at which the word lines WL intersect with the bit lines BL.

The control logic 202 may receive a command CMD and an address ADD from the controller 100 (refer to FIG. 1) and may also receive a control signal CTRL for controlling various functional blocks inside the non-volatile memory device 200 from the controller 100. The control logic 202 may output a control signal for writing data in the memory cell array 201 or reading data from the memory cell array 201 based on the command CMD, the address ADD, and the control signal CTRL. Accordingly, the control logic 202 may control the overall operation within the non-volatile memory device 200.

Various control signals output from the control logic 202 may be provided to the voltage generator 203, the row decoder 204, and the page buffer 205. For example, the control logic 202 may provide a voltage control signal CTRL_vol to the voltage generator 203, a row address X_ADD to the row decoder 204, and a column address Y_ADD to the page buffer 205.

The voltage generator 203 may generate various types of voltages for performing a program operation, a read operation, and an erase operation on the memory cell array 201 based on the voltage control signal CTRL_Vol. For example, the voltage generator 203 may generate a first driving voltage VWL for driving a plurality of word lines WL, a second driving voltage VSSL for driving a plurality of string select lines SSL, and a third driving voltage VGSL for driving a plurality of ground select lines GSL. The first driving voltage VWL may be a program voltage (or a write voltage), a read voltage, an erase voltage, a pass voltage, or a program verify voltage. The second driving voltage VSSL may be a string select voltage, that is, an ON voltage or an OFF voltage. The third driving voltage VGSL may be a ground select voltage, that is, an ON voltage or an OFF voltage.

The row decoder 204 may be connected to the memory cell array 201 via the word lines WL and activate some of the word lines WL in response to the row address X_ADD received from the control logic 202. For example, during a read operation, the row decoder 204 may apply a read voltage to a selected word line and apply a pass voltage to unselected word lines.

During a program operation, the row decoder 204 may apply a program voltage to a selected word line and apply a pass voltage to unselected word lines. In the present embodiment, in at least one of program loops, the row decoder 204 may apply a program voltage to a selected word line and an additionally selected word line.

The page buffer 205 may be connected to the memory cell array 201 via a plurality of bit lines BL. For example, during a read operation, the page buffer 205 may operate as a sense amplifier and output data stored in the memory cell array 201. During a program operation, the page buffer 205 may operate as a write driver and input data to be stored to the memory cell array 201.

Figure 4A:
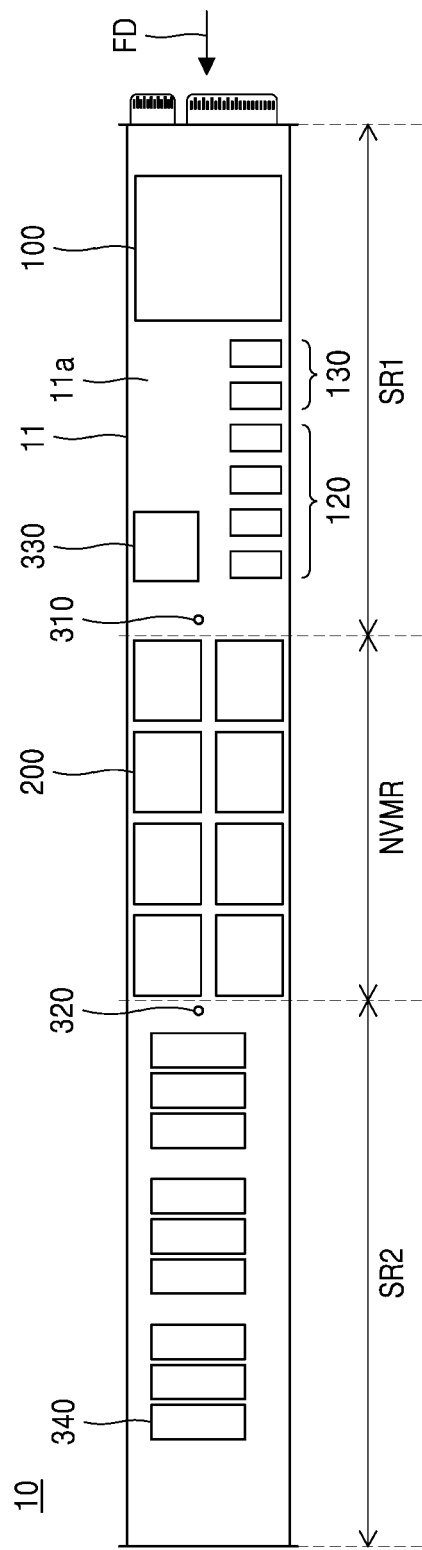
FIGS. 4A and 4B are plan views of a storage device according to example embodiments.
Figure 4B:
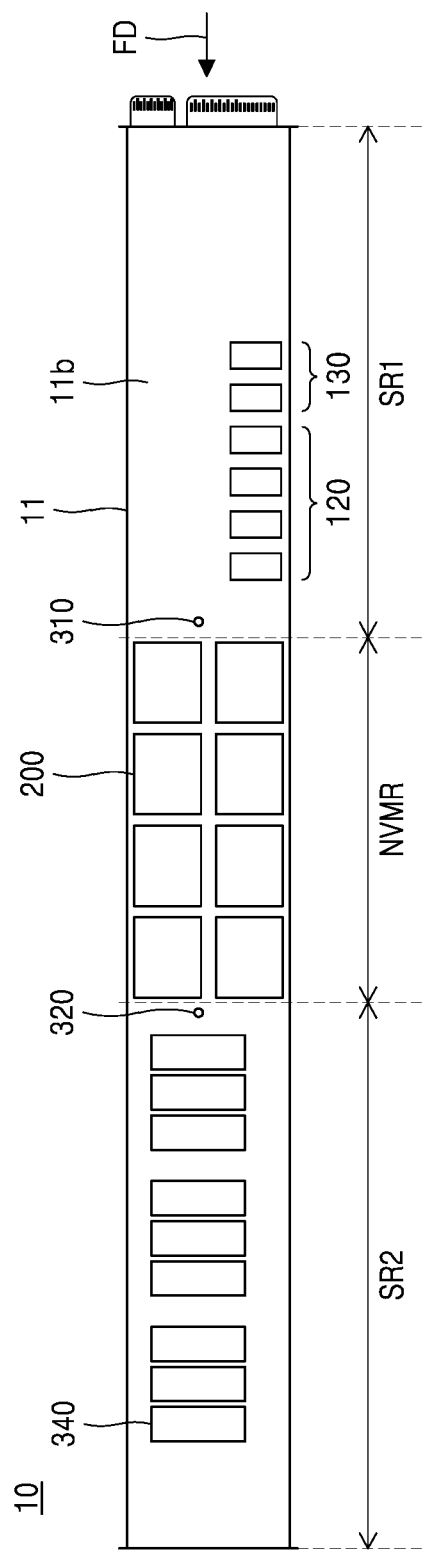

FIGS. 4A and 4B are plan views of the storage device 10 according to example embodiments.

According to example embodiments, the storage device 10 may be a dual in-line memory module (DIMM). FIG. 4A shows a first surface 11a of a package substrate 11 of the storage device 10, and FIG. 4B shows a second surface 11b of the package substrate 11.

The storage device 10 may include a casing for covering and protecting electronic elements included therein, and, in FIGS. 4A and 4B, arrows indicate a flowing direction FD of a fluid for cooling the casing of the storage device 10 and electronic elements within the casing in a system in which the storage device 10 is installed.

Referring to FIGS. 4A and 4B, the storage device 10 may include the package substrate 11. The package substrate 11 may include a non-volatile memory region NVMR in which a plurality of non-volatile memory devices 200 are mounted, a first sensing region SR1 in which the first temperature sensor 310 is disposed, and a second sensing region SR2 in which the second temperature sensor 320 is disposed.

According to example embodiments, the non-volatile memory region NVMR may be substantially at the center portion of the package substrate 11. According to example embodiments, the first sensing region SR1 and the second sensing region SR2 may be spaced apart from each other across the non-volatile memory region NVMR. According to example embodiments, the first sensing region SR1, the non-volatile memory region NVMR, and the second sensing region SR2 may be sequentially arranged in a flowing direction FD of the cooling fluid.

According to example embodiments, the first temperature sensor 310 and the second temperature sensor 320 may be spaced apart from each other with the non-volatile memory devices 200 interposed therbetween. According to example embodiments, the first temperature sensor 310, the non-volatile memory devices 200, and the second temperature sensor 320 may be arranged in the flowing direction FD of the cooling fluid. In some embodiments, the first temperature T1 (refer to FIG. 1) measured by the first temperature sensor 310 may be higher than the second temperature T2 (refer to FIG. 1) measured by the second temperature sensor 320. In some embodiments, the first temperature T1 (refer to FIG. 1) measured by the first temperature sensor 310 may be lower than the second temperature T2 (refer to FIG. 1) measured by the second temperature sensor 320.

According to example embodiments, the first temperature sensor 310 and the second temperature sensor 320 may be arranged on the first surface 11a of the package substrate 11, as shown in FIG. 4A. According to some example embodiments, the first temperature sensor 310 and the second temperature sensor 320 may be arranged on the second surface 11b of the package substrate 11, as shown in FIG. 4B.

According to example embodiments, one of the first temperature sensor 310 and the second temperature sensor 320 may be disposed on the first surface 11a of the package substrate 11, and the other of the first temperature sensor 310 and the second temperature sensor 320 may be disposed on the second surface 11b of the package substrate 11. For example, the first temperature sensor 310 may be disposed on the first surface 11a of the package substrate 11, whereas the second temperature sensor 320 may be disposed on the second surface 11b of the package substrate 11. In some embodiments, the first temperature sensor 310 may be disposed on the second surface 11b of the package substrate 11, whereas the second temperature sensor 320 may be disposed on the first surface 11a of the package substrate 11.

According to example embodiments, the controller 100, the DRAM 120, the SRAM 130, and a power management integrated circuit (PMIC) 330 may be further arranged in the first sensing region SR1 in addition to the first temperature sensor 310. In addition to the second temperature sensor 320, a passive device 340 such as a multi-layered ceramic capacitor (MLCC) may be further disposed in the second sensing region SR2.

Figure 5:
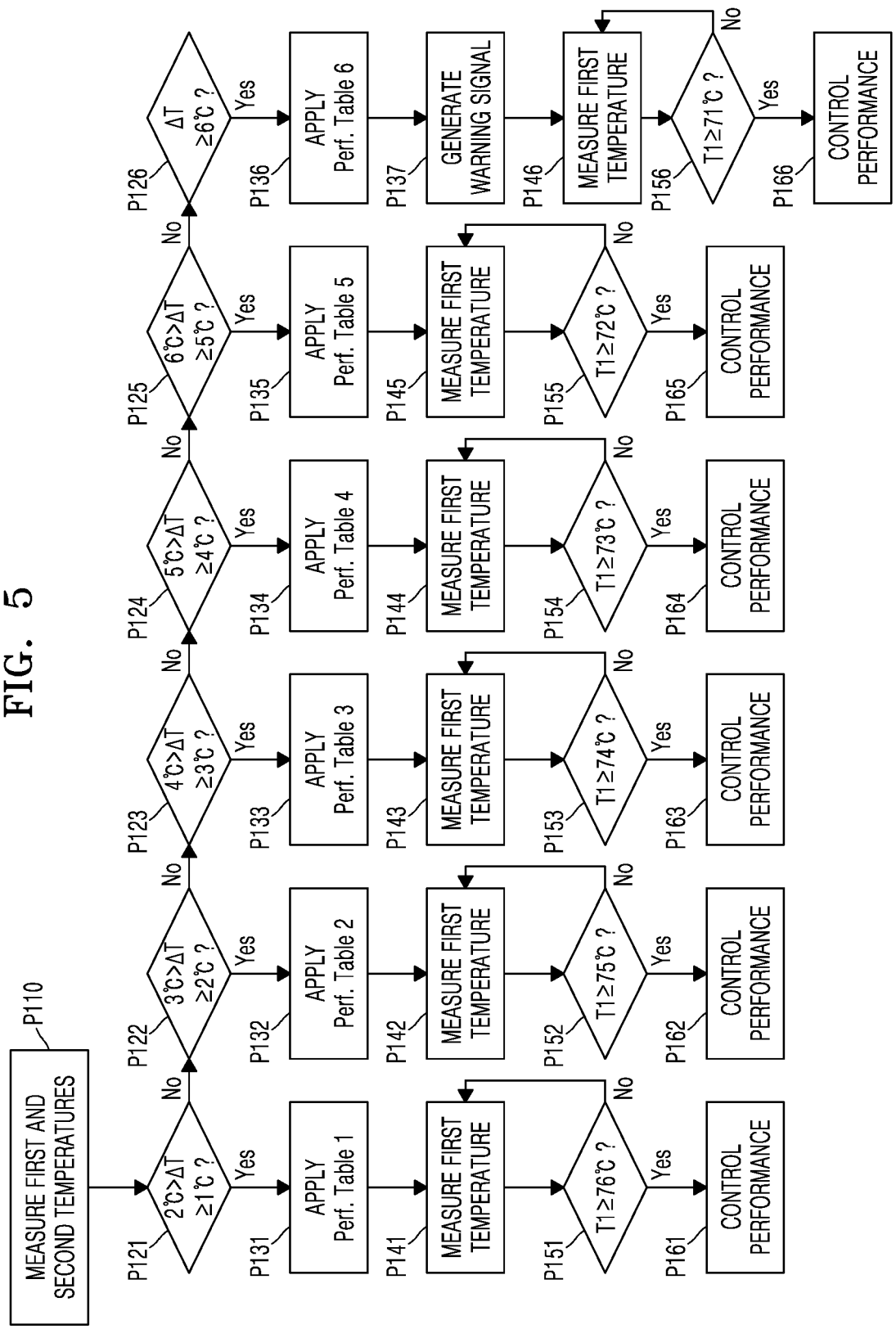
FIG. 5 is a flowchart of a method of controlling a temperature according to example embodiments.

FIG. 5 is a flowchart of a method of controlling a temperature according to example embodiments.

Referring to FIGS. 1 and 5, in P110, the first temperature T1 and the second temperature T2 may be measured by using the first temperature sensor 310 and the second temperature sensor 320, respectively.

Next, in P121 to P126, a difference ΔT between the first temperature T1 and the second temperature T2 may be compared with set ranges. According to example embodiments, the controller 100 may select one of a plurality of performance tables (e.g., first to sixth performance tables) based on the difference ΔT.

For example, when the difference ΔT satisfies a first range (e.g., equal to or higher than 1° C. and less than 2° C.) in P121 (Yes), a first performance table may be applied in P131. Otherwise, when the difference ΔT does not satisfy the first range in P121 (No), the difference ΔT may be compared with a second range in P122.

When the difference ΔT satisfies the second range (e.g., equal to or higher than 2° C. and less than 3° C.) in P122 (Yes), a second performance table may be applied in P132. Otherwise, when the difference ΔT does not satisfy the second range in P122 (No), the difference ΔT may be compared with a third range in P123.

When the difference ΔT satisfies the third range (e.g., equal to or higher than 3° C. and less than 4° C.) in P123 (Yes), a third performance table may be applied in P133. Otherwise, when the difference ΔT does not satisfy the third range in P123 (No), the difference ΔT may be compared with a fourth range in P124.

When the difference ΔT satisfies the fourth range (e.g., equal to or higher than 4° C. and less than 5° C.) in P124 (Yes), a fourth performance table may be applied in P134. Otherwise, when the difference ΔT does not satisfy the fourth range in P124 (No), the difference ΔT may be compared with a fifth range in P125.

When the difference ΔT satisfies the fifth range (e.g., equal to or higher than 5° C. and less than 6° C.) in P125 (Yes), a fifth performance table may be applied in P135. Otherwise, when the difference ΔT does not satisfy the fifth range in P125 (No), the difference ΔT may be compared with a sixth range in P126.

When the difference ΔT satisfies the sixth range (e.g., 6° C. or higher) in P126 (Yes), a sixth performance table may be applied in P136, and the controller 100 may generate a warning signal in P137. According to example embodiments, when the difference ΔT is equal to or higher than a set value (e.g., 6° C.), the controller 100 may determine that there is a problem in a cooling system inside the system 1 in which the storage device 10 is installed and transmit the warning signal to the host 20. The host 20 may indicate a signal for maintenance of the cooling system through a display device and an alarm, for example.

The lower the temperature range with the upper limit and the lower limit of the difference ΔT is, the higher the performance control entering temperature of a performance table may be. For example, the first to sixth performance tables may have sequentially decreasing performance control entering temperatures. For example, the performance control entering temperature of the second performance table may be lower than the performance control entering temperature of the first performance table, the performance control entering temperature of the third performance table may be lower than the performance control entering temperature of the second performance table, and the performance control entering temperature of the fourth performance table may be lower than the performance control entering temperature of the third performance table. Operation performance at the same temperature may sequentially decrease from the first performance table to the sixth performance table. In some embodiments, each of the plurality of performance tables may have a predetermined maximum performance level, and in each performance table, a performance control entering temperature represents a temperature of the first temperature T1 at which or above which a performance level of at least one non-volatile memory device 200 is lowered from a predetermined maximum performance level.

A performance table corresponding to a relatively small difference ΔT may have operation performance for a higher temperature range than a performance table corresponding to a relatively large difference ΔT. For example, the first performance table may include information regarding operation performance corresponding to a higher temperature range than the second performance table, the second performance table may include information regarding operation performance corresponding to a higher temperature range than the third performance table, and the third performance table may include information regarding operation performance corresponding to a higher temperature range than the fourth performance table.

Next, the first temperature T1 may be measured in P141 to P146, and the first temperature T1 may be compared with the performance control entering temperatures of selected performance tables in P151 to P156. For example, in P151, when the first temperature T1 is equal to or higher than the performance control entering temperature of the first performance table (i.e., 76° C.), the performance of the storage device 10 may begin to be limited in P161. For example, the performance of the storage device 10 may be controlled to be lower than the maximum operation performance level of the storage device 10 allowed in the selected performance table 1. When the first temperature T1 is less than 76° C., the first temperature T1 may be monitored while the maximum operation performance (i.e., the maximum operation performance level) of the storage device 10 is maintained.

In P152, when the first temperature T1 is equal to or higher than the performance control entering temperature of the second performance table (i.e., 75° C.), the performance of the storage device 10 may begin to be limited in P162. For example, the performance of the storage device 10 may be controlled to be lower than the maximum operation performance of the storage device 10 allowed in the selected performance table 2. When the first temperature T1 is less than 75° C., the first temperature T1 may be monitored while the maximum operation performance of the storage device 10 is maintained.

In P153, when the first temperature T1 is equal to or higher than the performance control entering temperature of the third performance table (i.e., 74° C.), the performance of the storage device 10 may begin to be limited in P163. For example, the performance of the storage device 10 may be controlled to be lower than the maximum operation performance of the storage device 10 allowed in the selected performance table 3. When the first temperature T1 is less than 74° C., the first temperature T1 may be monitored while the maximum operation performance of the storage device 10 is maintained.

For example, in P154, when the first temperature T1 is equal to or higher than the performance control entering temperature of the fourth performance table (i.e., 73° C.), the performance of the storage device 10 may begin to be limited in P164. For example, the performance of the storage device 10 may be controlled to be lower than the maximum operation performance of the storage device 10 allowed in the selected performance table 4. When the first temperature T1 is less than 73° C., the first temperature T1 may be monitored while the maximum operation performance of the storage device 10 is maintained.

In P155, when the first temperature T1 is equal to or higher than the performance control entering temperature of the fifth performance table (i.e., 72° C.), the performance of the storage device 10 may begin to be limited in P165. For example, the performance of the storage device 10 may be controlled to be lower than the maximum operation performance of the storage device 10 allowed in the selected performance table 5. When the first temperature T1 is less than 72° C., the first temperature T1 may be monitored while the maximum operation performance of the storage device 10 is maintained.

In P156, when the first temperature T1 is equal to or higher than the performance control entering temperature of the sixth performance table (i.e., 71° C.), the performance of the storage device 10 may begin to be limited in P166. For example, the performance of the storage device 10 may be controlled to be lower than the maximum operation performance of the storage device 10 allowed in the selected performance table 6. When the first temperature T1 is less than 71° C., the first temperature T1 may be monitored while the maximum operation performance of the storage device 10 is maintained.

Although it has been described above that the performance of the storage device 10 is adjusted based on one selected from among a plurality of performance tables and the first temperature T1 detected by a first temperature sensor 310, it is merely an example, and the inventive concept is not limited thereto. For example, the performance of the storage device 10 may be adjusted based on one selected from among a plurality of performance tables and the second temperature T2 detected by a second temperature sensor 320. In the case of adjusting the performance of the storage device 10 based on the second temperature T2, performance control entering temperatures of respective performance tables may be lower than those in the case of using the first temperature T1.

According to example embodiments, as described later with reference to FIG. 6, because selection of a performance table depends on the difference $\Delta T$ between the first temperature T1 and the second temperature T2, when the difference $\Delta T$ is relatively small, performance control may begin at a relatively high temperature. Therefore, a time period in which the storage device 10 operates with the maximum performance may be maximized.

Although the inventive concept has been described above with reference to FIG. 5 based on a case where 6 performance tables are used for convenience of explanation, it is merely an example, and the inventive concept is not limited thereto in any aspect. In some embodiments, 2 to 5 performance tables may be used or 7 or more performance tables may be used, based on the descriptions given herein.

Figure 6:
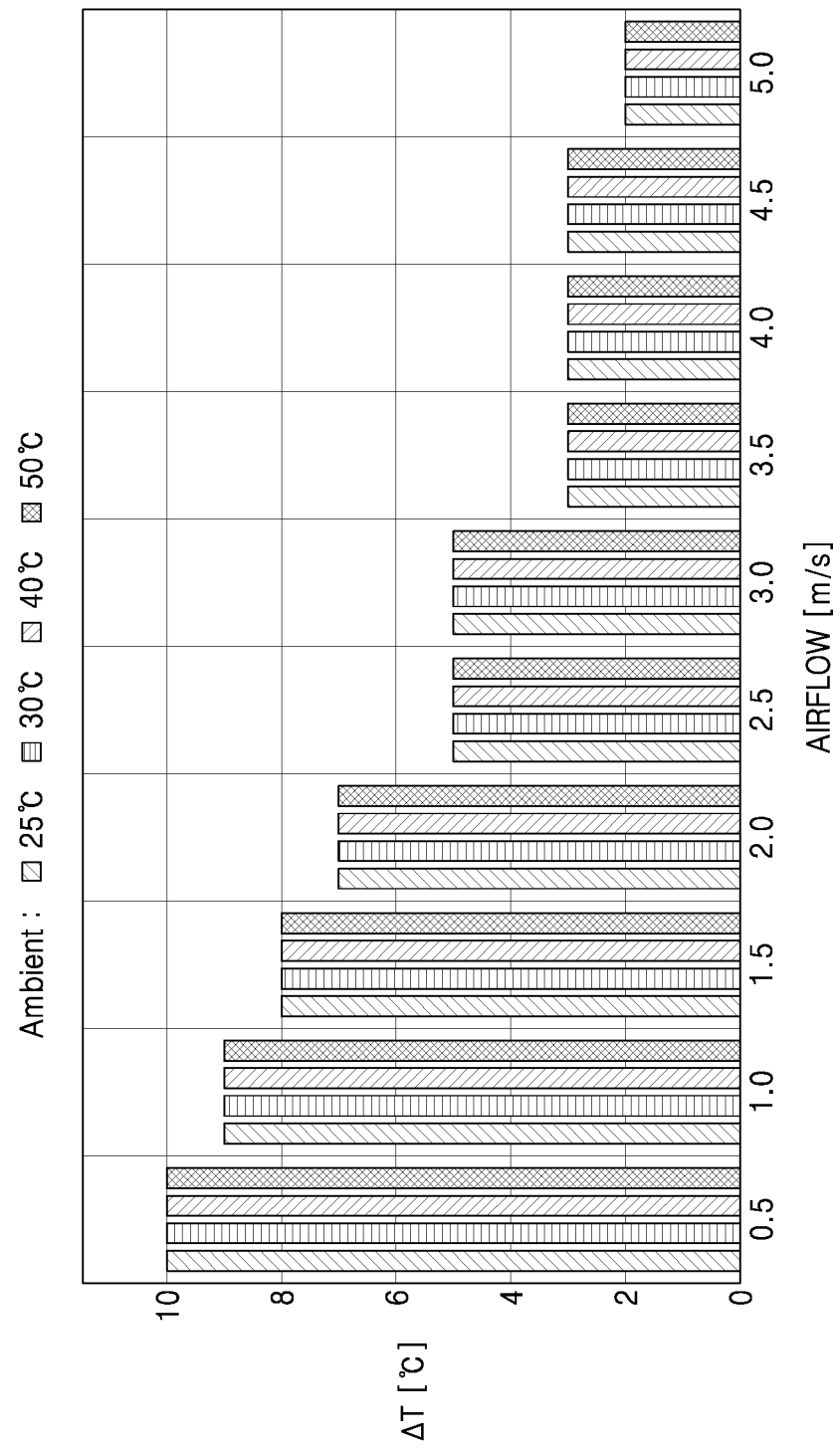
FIG. 6 is a graph for describing effects according to example embodiments.

FIG. 6 is a graph for describing effects according to example embodiments.

In FIG. 6, the horizontal axis represents flow speeds of a fluid for cooling the casing of the storage device 10, and the vertical axis represents respective differences $\Delta T$ between the first temperature T1 and the second temperature T2 when the ambient temperature is 25° C., 30° C., 40, and 50° C.

Referring to FIG. 6, the difference $\Delta T$ between the first temperature T1 and the second temperature T2 is irrelevant to the ambient temperature and dependent on the flow speed of the fluid for cooling the casing. For example, by determining the difference $\Delta T$ between the first temperature T1 and the second temperature T2, the flow speed of a fluid for cooling the casing may be determined.

According to example embodiments, by selecting one of a plurality of performance tables based on the difference $\Delta T$ between the first temperature T1 and the second temperature T2, performance control of the storage device 10 considering the ambient environment may be implemented. Therefore, the storage device 10 may be prevented from entering performance control quicker than necessary, and thus, the maximum performance operation time of the storage device 10 may be maximized while satisfying the performance policy of a system.

Figure 7:
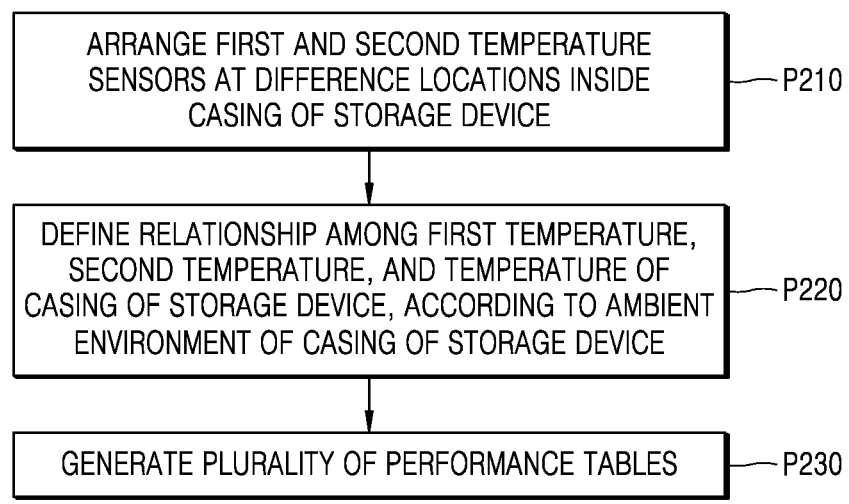
FIG. 7 is a flowchart of a method of providing a plurality of performance tables according to example embodiments.

FIG. 7 is a flowchart of a method of providing a plurality of performance tables according to example embodiments.

Referring to FIGS. 1 and 7, in P210, the first temperature sensor 310 and the second temperature sensor 320 may be arranged at different locations inside the casing of the storage device 10. According to example embodiments, the first temperature sensor 310 and the second temperature sensor 320 may be sequentially arranged in the first sensing region SR1 and the second sensing region SR2, as shown in FIGS. 4A and 4B. According to example embodiments, the first temperature sensor 310 may be disposed at a location corresponding to the highest temperature inside the casing of the storage device 10, whereas the second temperature sensor 320 may be disposed at a location corresponding to the lowest temperature inside the casing of the storage device 10. However, the inventive concept is not limited thereto.

Next, in P220, a relationship between the first temperature T1, the second temperature T2, and a temperature Tc of the casing of the storage device 10 according to an ambient environment (e.g., an ambient temperature and a flow speed of a cooling fluid) of the casing of the storage device 10 may be defined. For example, the ambient environment may be determined based on the difference ΔT between the first temperature T1 and the second temperature T2, and a difference between at least one of the first temperature T1 and the second temperature T2 and the temperature Tc of the casing of the storage device 10 may be determined based on the determined ambient environment.

Next, in P230, a plurality of performance tables may be generated based on the relationship (e.g., a temperature difference) between the first temperature T1 and the second temperature T2, and the temperature Tc of the casing of the storage device 10.

Tables 1 to 6 below are examples of a plurality of performance tables different from one another, and Tables 1 to 6 sequentially correspond to higher differences ΔT.

TABLE 1

| Performance Control Level | Operation Performance | T1 | T2 | ΔT | Tc | T1-Tc |
|---|---|---|---|---|---|---|
| 0 | 100% | Less than 74° C. | Less than 71° C. | 3° C. | Less than 70° C. | 4° C. |
| 1 | 85% | 74° C. | 71° C. | 3° C. | 70° C. | 4° C. |
| 2 | 45% | 76° C. | 73° C. | 3° C. | 72° C. | 4° C. |
| 3 | 22% | 78° C. | 75° C. | 3° C. | 74° C. | 4° C. |
| 4 | 0% | 97° C. | 94° C. | 3° C. | 93° C. | 4° C. |

Table 1 corresponds to a case in which the flow speed is within the range from about 3.5 m/s to about 4.5 m/s in FIG. 6. Terms such as "about" or "approximately" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

TABLE 2

| Performance Control Level | Operation Performance | T1 | T2 | ΔT | Tc | T1-Tc |
|---|---|---|---|---|---|---|
| 0 | 100% | Less than 72° C. | Less than 67° C. | 5° C. | Less than 70° C. | 2° C. |
| 1 | 85% | 72° C. | 67° C. | 5° C. | 70° C. | 2° C. |
| 2 | 45% | 74° C. | 69° C. | 5° C. | 72° C. | 2° C. |
| 3 | 22% | 76° C. | 71° C. | 5° C. | 74° C. | 2° C. |
| 4 | 0% | 95° C. | 90° C. | 5° C. | 93° C. | 2° C. |

Table 2 corresponds to a case in which the flow speed is within the range from about 2.5 m/s to about 3.0 m/s in FIG. 6.

TABLE 3

| Performance Control Level | Operation Performance | T1 | T2 | ΔT | Tc | T1-Tc |
|---|---|---|---|---|---|---|
| 0 | 100% | Less than 70° C. | Less than 63° C. | 7° C. | Less than 70° C. | 0° C. |
| 1 | 85% | 70° C. | 63° C. | 7° C. | 70° C. | 0° C. |
| 2 | 45% | 72° C. | 65° C. | 7° C. | 72° C. | 0° C. |
| 3 | 22% | 74° C. | 67° C. | 7° C. | 74° C. | 0° C. |
| 4 | 0% | 93° C. | 86° C. | 7° C. | 93° C. | 0° C. |

Table 3 corresponds to a case in which the flow speed is about 2.0 m/s in FIG. 6.

TABLE 4

| Performance Control Level | Operation Performance | T1 | T2 | ΔT | Tc | T1-Tc |
|---|---|---|---|---|---|---|
| 0 | 100% | Less than 69° C. | Less than 61° C. | 8° C. | Less than 70° C. | −1° C. |
| 1 | 85% | 69° C. | 61° C. | 8° C. | 70° C. | −1° C. |
| 2 | 45% | 71° C. | 63° C. | 8° C. | 72° C. | −1° C. |
| 3 | 22% | 73° C. | 65° C. | 8° C. | 74° C. | −1° C. |
| 4 | 0% | 92° C. | 84° C. | 8° C. | 93° C. | −1° C. |

Table 4 corresponds to a case in which the flow speed is about 1.5 m/s in FIG. 6.

TABLE 5

| Performance Control Level | Operation Performance | T1 | T2 | ΔT | Tc | T1-Tc |
|---|---|---|---|---|---|---|
| 0 | 100% | Less than 68° C. | Less than 59° C. | 9° C. | Less than 70° C. | −2° C. |
| 1 | 85% | 68° C. | 59° C. | 9° C. | 70° C. | −2° C. |
| 2 | 45% | 70° C. | 61° C. | 9° C. | 72° C. | −2° C. |
| 3 | 22% | 72° C. | 63° C. | 9° C. | 74° C. | −2° C. |
| 4 | 0% | 91° C. | 82° C. | 9° C. | 93° C. | −2° C. |

Table 5 corresponds to a case in which the flow speed is about 1.0 m/s in FIG. 6.

TABLE 6

| Performance Control Level | Operation Performance | T1 | T2 | ΔT | Tc | T1-Tc |
|---|---|---|---|---|---|---|
| 0 | 100% | Less than 67° C. | Less than 57° C. | 10° C. | Less than 70° C. | −3° C. |
| 1 | 85% | 67° C. | 57° C. | 10° C. | 70° C. | −3° C. |
| 2 | 45% | 69° C. | 59° C. | 10° C. | 72° C. | −3° C. |
| 3 | 22% | 71° C. | 61° C. | 10° C. | 74° C. | −3° C. |
| 4 | 0% | 90° C. | 80° C. | 10° C. | 93° C. | −3° C. |

Table 6 corresponds to a case in which the flow speed is about 0.5 m/s in FIG. 6.

At a performance control level 0, because the temperature of the casing is at the safe level, performance control is not performed. For example, at the performance control level 0, the storage device 10 may operate at the maximum operation performance of the storage device 10 without compromising the performance due to the temperature of the casing. At performance control levels 1 to 3, the performance of the storage device 10 may be limited or lowered to 85%, 45%, and 22%, respectively. A performance control level 4 is a protection level. At the performance control level 4, the operation of the storage device 10 may be stopped until the temperature Tc of the casing becomes sufficiently low.

In Tables 1 to 6, the greater the difference ΔT of a performance table is, the lower the entry temperatures of performance control levels may be. For example, a first level entry temperature of Table 2 may be lower than a first level entry temperature of Table 1. The smaller the difference ΔT of a performance table is, the higher the performance of the storage device 10 may be at the same temperature. For example, when the first temperature T1 is 72° C., the operation performance of Table 1 may be 100%, whereas the operation performance of Table 2 may be 85%.

While the inventive concept has been particularly shown and described with reference to embodiments thereof, it will be understood that various changes in form and details may be made therein without departing from the spirit and scope of the following claims.

What is claimed is:

1. A storage device comprising:
   at least one non-volatile memory device;
   a first temperature sensor and a second temperature sensor arranged adjacent to the at least one non-volatile memory device; and
   a controller configured to:
     receieve a first temperature detected by the first temperature sensor, and a second temperature detected by the second temperature sensor;
     select a first performance table among a plurality of performance tables based on a result of a calculation performed on the first temperature and the second temperature; and
     control an operation performance level of the at least one non-volatile memory device based on the first performance table,
   wherein each of the plurality of performance tables includes a plurality of entries, each of the plurality of entries including information regarding the operation performance level of the at least one non-volatile memory device.

2. The storage device of claim 1,
   wherein the first temperature sensor and the second temperature sensor are arranged outside the at least one non-volatile memory device and the controller.

3. The storage device of claim 1,
   wherein the first temperature sensor and the second temperature sensor are spaced apart from each other across the at least one non-volatile memory device.

4. The storage device of claim 1, further comprising:
   a casing covering the at least one non-volatile memory device, the controller, and the first and second temperature sensors,
   wherein the first temperature sensor, the at least one non-volatile memory device, and the second temperature sensor are disposed in the casing and sequentially arranged in a flowing direction of a cooling fluid for cooling the casing.

5. The storage device of claim 1,
   wherein the result of the calculation is a difference between the first temperature and the second temperature.

6. The storage device of claim 1,
   wherein the plurality of performance tables comprise:
     a first performance table corresponding to a first difference between the first temperature and the second temperature; and
     a second performance table corresponding to a second difference between the first temperature and the second temperature, which is greater than the first difference.

7. The storage device of claim 6,
   wherein a performance control entering temperature regarding the at least one non-volatile memory device in the first performance table is higher than a performance control entering temperature regarding the at least one non-volatile memory device in the second performance table, and
   wherein in each of the plurality of performance tables with a predetermined maximum performance level, a performance control entering temperature represents a temperature of the first temperature at which or above which a performance level of at least one non-volatile memory device is lowered from a predetermined maximum performance level.

8. The storage device of claim 1,
   wherein the controller is configured to control the operation performance level of the at least one non-volatile memory device based on the first temperature and a performance table selected from among the plurality of performance tables.

9. The storage device of claim 8,
   wherein the first temperature is higher than the second temperature.

10. The storage device of claim 1,
    wherein the controller is configured to generate a warning signal in response to a difference between the first temperature and the second temperature being equal to or greater than a predetermined temperature difference.

11. A method of operating a storage device, the method comprising:
    detecting a first temperature of a first portion adjacent to a non-volatile memory device and a second temperature of a second portion spaced apart from the first portion across the non-volatile memory device;
    selecting one of a plurality of performance tables based on a result of a calculation performed on the first temperature and the second temperature, wherein the plurality of performance tables include information regarding an operation performance level of the nonvolatile memory device based on the first temperature and the second temperature; and
    controlling the operation performance level of the non-volatile memory device based on the first temperature within the performance table selected from among the plurality of performance tables,
    wherein the first temperature is higher than the second temperature.

12. The method of claim 11,
    wherein the selecting of one of the plurality of performance tables is performed based on a difference between the first temperature and the second temperature.

13. The method of claim 11,
wherein the plurality of performance tables comprise:
- a first performance table corresponding to a first difference between the first temperature and the second temperature; and
- a second performance table corresponding to a second difference between the first temperature and the second temperature.

14. The method of claim 13,
wherein the second difference is greater than the first difference, and
wherein the first performance table comprises information regarding an operation performance level corresponding to a higher temperature range than the second performance table.

15. The method of claim 11, further comprising:
generating a warning signal in response to a difference between the first temperature and the second temperature being equal to or greater than a predetermined temperature difference.

16. A method of providing a plurality of performance tables, the method comprising:
- arranging a first temperature sensor and a second temperature sensor at different locations inside a casing of a storage device comprising a plurality of non-volatile memory devices;
- defining a relationship among a first temperature detected by the first temperature sensor, a second temperature detected by the second temperature sensor, and a temperature of the casing, according to a flowing speed of a fluid for cooling the casing and an ambient temperature around the casing; and
- generating a plurality of performance tables, wherein each of the plurality of performance tables is associated with a corresponding flow speed of the fluid for cooling and comprises a plurality of entries, each entry comprising information regarding an operation performance level of the non-volatile memory devices based on the relationship among the temperature of the casing, the first temperature, and the second temperature; and
wherein the first temperature sensor is adjacent to a first side of a region where the at least one non-volatile memory device is disposed, the second temperature sensor is adjacent to a second side, opposite to the first side in the flowing direction, of the region where the at least one non-volatile memory device is disposed.

17. The method of claim 16,
wherein the first temperature sensor and the second temperature sensor are spaced apart from each other across the non-volatile memory devices in a flowing direction of the fluid.

18. The method of claim 16,
wherein the plurality of performance tables comprise:
- a first performance table corresponding to a first difference between the first temperature and the second temperature; and
- a second performance table corresponding to a second difference between the first temperature and the second temperature, wherein the second difference is greater than the first difference, and
wherein the first performance table comprises information regarding an operation performance level corresponding to a higher temperature range than the second performance table.

19. The method of claim 16,
wherein the performance tables comprise a first performance table corresponding to a first flowing speed of the fluid and a second performance table corresponding to a second flowing speed of the fluid, and
wherein the first flowing speed is greater than the second flowing speed, and wherein the first performance table comprises an entry corresponding to an operation performance level higher than the second performance table at the same temperature.

* * * * *